(12) United States Patent
Beteille et al.

(10) Patent No.: US 7,033,655 B2
(45) Date of Patent: Apr. 25, 2006

(54) LAMINATED GLAZING AND MEANS FOR ITS PERIPHERAL SEALING

(75) Inventors: Fabien Beteille, Paris (FR); Jean-Christophe Giron, Aachens (FR)

(73) Assignee: Saint-Gobain Glass France, Courbevoi (FR)

( * ) Notice: Subject to any disclaimer, the term of this patent is extended or adjusted under 35 U.S.C. 154(b) by 30 days.

(21) Appl. No.: 10/399,484

(22) PCT Filed: Oct. 17, 2001

(86) PCT No.: PCT/FR01/03203

§ 371 (c)(1), (2), (4) Date: Oct. 15, 2003

(87) PCT Pub. No.: WO02/33207

PCT Pub. Date: Apr. 25, 2002

(65) Prior Publication Data

US 2004/0067343 A1    Apr. 8, 2004

(30) Foreign Application Priority Data

Oct. 18, 2000  (FR) .................................. 00 13307

(51) Int. Cl.
C09K 19/00 (2006.01)
G02F 1/15 (2006.01)
G09G 3/38 (2006.01)
H01J 40/00 (2006.01)
H01L 25/00 (2006.01)

(52) U.S. Cl. ............... 428/1.5; 428/192; 428/690; 428/917; 359/265; 345/105; 250/200; 136/244

(58) Field of Classification Search ................ 428/1.5, 428/1.52, 1.53, 34, 157, 192, 690, 917; 52/786.1, 52/786.13; 296/96.14; 345/105; 359/265; 136/244; 250/200

See application file for complete search history.

(56) References Cited

U.S. PATENT DOCUMENTS

| 2,077,305 | A | * | 4/1937 | Batchell ........................ 428/34 |
| 4,435,047 | A |   | 3/1984 | Fergason ..................... 350/334 |
| 4,613,530 | A | * | 9/1986 | Hood et al. .................... 428/34 |
| 4,614,676 | A | * | 9/1986 | Rehfeld ........................ 428/34 |
| 4,622,249 | A | * | 11/1986 | Bowser ........................ 428/34 |
| 4,732,456 | A |   | 3/1988 | Fergason et al. ............. 350/334 |
| 4,806,922 | A |   | 2/1989 | McLaughlin et al. ....... 340/784 |
| 4,844,591 | A |   | 7/1989 | Arribart et al. ............. 350/357 |
| 5,239,406 | A |   | 8/1993 | Lynam ......................... 359/275 |
| 5,282,301 | A |   | 2/1994 | Roentgen et al. .............. 29/33 |
| 5,378,305 | A |   | 1/1995 | Gillner et al. .............. 156/574 |
| 5,507,965 | A |   | 4/1996 | Padoy et al. ................ 252/62.2 |

(Continued)

FOREIGN PATENT DOCUMENTS

DE      CH672612 A5 *  12/1989

(Continued)

OTHER PUBLICATIONS

U.S. Appl. No. 10/399,484, filed Oct. 15, 2003, Beteille, et al.
U.S. Appl. No. 10/773,170, filed Feb. 9, 2004, Giron.

Primary Examiner—Donald J. Loney
(74) Attorney, Agent, or Firm—Oblon, Spivak, McClelland, Maier & Neustadt, P.C.

(57) ABSTRACT

The present invention relates to a laminated glazing which has first and second substrates with peripheral edges, an active system disposed between the substrates, and at least two peripheral seals that run contiguously from the first and second substrates.

31 Claims, 1 Drawing Sheet

U.S. PATENT DOCUMENTS

| | | | |
|---|---|---|---|
| 5,540,961 A * | 7/1996 | Reul et al. | 428/34 |
| 5,615,040 A | 3/1997 | Watanabe | 359/288 |
| 5,643,644 A | 7/1997 | Demars | 428/34 |
| 5,698,277 A * | 12/1997 | Schueller et al. | 428/34 |
| 5,932,329 A | 8/1999 | Frost et al. | 428/214 |
| 5,935,702 A | 8/1999 | Macquart et al. | 428/336 |
| 5,980,666 A | 11/1999 | Roth et al. | 156/107 |
| 5,985,486 A | 11/1999 | Giron | 429/188 |
| 6,001,487 A | 12/1999 | Ladang et al. | 428/432 |
| 6,045,896 A | 4/2000 | Boire et al. | 428/216 |
| 6,277,523 B1 | 8/2001 | Giron | 429/304 |
| 6,337,758 B1 | 1/2002 | Beteille et al. | 359/265 |
| 6,340,508 B1 * | 1/2002 | Frommelt et al. | 428/34 |

FOREIGN PATENT DOCUMENTS

| | | |
|---|---|---|
| DE | 4 104 108 | 8/1992 |
| EP | 0 061 282 | 9/1982 |
| EP | 0 238 164 | 9/1987 |
| EP | 0 499 525 | 8/1992 |
| EP | 0 627 389 | 12/1994 |
| EP | 0 638 528 | 2/1995 |
| EP | 0 639 450 | 2/1995 |
| EP | 0 506 521 | 9/1995 |
| EP | 0 785 700 | 7/1997 |
| EP | 0 878 296 | 11/1998 |
| EP | 0 916 801 | 5/1999 |
| FR | 2 770 222 | 4/1999 |
| JP | 20000159549 A * | 6/2000 |
| WO | WO 92/19695 | 11/1992 |
| WO | WO 93/09460 | 5/1993 |
| WO | WO 94/20294 | 9/1994 |
| WO | WO 00/57243 | 9/2000 |

* cited by examiner

LAMINATED GLAZING AND MEANS FOR ITS PERIPHERAL SEALING

CROSS-REFERENCE TO RELATED APPLICATIONS

This application is a national stage filing under 35 USC § 371 based upon PCT/FR01/03203 filed Oct. 17, 2001.

FIELD OF THE INVENTION

The present invention relates to laminated glazing and more particularly to glazing which has functionalities imparted by one or more layers and/or one or more discontinuous elements which may be organic, mineral or hybrid organic/mineral in nature. Laminated glazing usually consists of two rigid substrates between which is based a sheet or a superposition of sheets of thermoplastic-type polymer. The invention also includes laminated glazing known as "asymmetric glazing" using a single substrate of the glass type associated with several sheets of polymer, including in general at least one based on polyurethane. The invention also includes laminated glazing having at least one interlayer based on a single-sided or double-sided adhesive polymer of the elastomer type (that is to say one not requiring a laminating operation within the conventional meaning of the term—laminating requiring heat and generally pressure to soften the thermoplastic interlayer and make it adhesive).

BACKGROUND OF THE INVENTION

The above-mentioned layers or discontinuous elements are generally placed against one of the rigid substrates (or against the single rigid substrate), between the said substrate and the polymer-based flexible sheet or one of the said sheets. They may also be placed between two flexible or semiflexible substrates which themselves are associated with a rigid substance or may be placed between two rigid substrates. They will be denoted hereafter by the term "active systems." The glazing may comprise several active systems.

The first types of active system of interest to the invention are in general electrochemical systems, and more particularly electrocontrollable systems of the type in which the glazing has variable energy and/or optical properties. They also include photovoltaic and electroluminescent systems.

These systems have very varied applications: photovoltaic cells convert solar energy into light energy.

Electrocontrollable systems make it possible to obtain, in particular, glazing of which the darkening/degree of vision or filtration of the thermal/solar radiation may be modified at will. These include, for example, viologen-based glazing which allows the light transmission or absorption to be regulated, as described in Patents U.S. Pat. No. 5,239,406 and EP-612 82.

Electroluminescent systems convert electrical energy directly into light, an example being described in Patent FR-2 770 222.

There is also electrochromic glazing which allows the light and thermal transmission to be modulated. This is described, for example, in the Patents EP-253 713 and EP-670 346, the electrolyte being in the form of a polymer or a gel and the other layers being of mineral type. Another type is described in the Patents EP-867 752, EP-831 360, PCT/FR00/00675 and PCT/FR99/01653, the electrolyte this time being in the form of an essentially mineral layer, all of the layers of the system then essentially being mineral: this type of electrochromic system is commonly referred to by the name "all-solid-state" electrochromic system. There are also electrochromic systems in which all of the layers are of the polymer type, and then one speaks of "all-polymer" electrochromic systems.

In general, electrochromic systems comprise two layers of electrochromic material which are separated by an electrolyte layer and flanked by two electrically conducting layers.

There are also systems called "optical valves": these are polymer-based films in which are dispersed microdroplets containing particles capable of lying in a preferred direction under the effect of an electric field. An example of this is described in the Patent WO 93/09460.

There are also liquid-crystal systems, which operate in a similar way to the previous ones: they use a polymer film placed between two conducting layers and droplets of liquid crystals are dispersed in the said film, especially nematic liquid crystals having positive dielectric anisotropy. When a voltage is applied to the film, the liquid crystals are oriented along a preferred axis, allowing vision. With no voltage applied, the film becomes scattering. Examples of these are described in the Patents EP-238 164, U.S. Pat. No. 4,435,047, U.S. Pat. No. 4,806,922, U.S. Pat. No. 4,732,456. Mention may also be made of cholesteric liquid-crystal polymers, such as those described in the Patent WO 92/19695.

A second type of active system of interest to the invention relates to layers or multilayers whose properties are modified without any electrical supply, due to the effect of heat or light: mention may be made of thermochromic layers, especially those based on vanadium oxide, thermotropic layers and photochromic layers. Within the context of the present invention and throughout the present text, the term "layer" should be taken in its widest sense: the layers may just as well be made of mineral materials as organic-type materials, most particularly polymers, which may be in the form of polymer films or even of gel films. This is especially the case with thermotropic gels, for example those described in the Patents EP 639 450, U.S. Pat. No. 5,615,040, WO 94/20294 and EP 878 296.

A third type of active system of interest to the invention relates to elements in the form of heating wires or grids, or conducting layers heating by the Joule effect (these may be wires embedded in the surface of the thermoplastic sheet, as described for example in the Patents EP-785 700, EP-553 025, EP-506 521 and EP-496 669).

A fourth type of active system of interest to the invention relates to layers or multilayers having solar-control or low-emissivity properties, especially those based on one or more silver layers interspersed by dielectric layers. These multilayers may be deposited on one of the rigid substrates or on a flexible substrate of the PET (polyethylene terephthalate) type which is placed between two sheets of thermoplastic polymer of the PVB (polyvinyl butyral) type joining together the two rigid substrates of the glass type. Examples of these are found in the Patents EP-638 528, EP-718 250, EP-724 955, EP-758 583 and EP-847 965.

Some of these systems require means of electrical connection to an external current source, which must be designed so as to avoid any short circuit. All these systems have in common the fact that they may, to a greater or lesser extent, be sensitive to mechanical or chemical attack, to contact with water or to exchanges with the outside.

These are the reasons why, in order to preserve their correct operation, these active systems are usually placed against at least one protective carrier substrate. They are usually placed between two protective substrates, for example made of glass, or made of a rigid, semirigid or flexible polymer, either by direct contact or via one or more thermoplastic-type joining polymer sheets. They usually have the laminated structure described above. Peripheral sealing means are often provided, the purpose of which is to isolate the active system as far as possible from the outside. It is general practice to use butyl rubber seals combined with silicone or polysulphide seals, which are capable, in particular, of limiting the diffusion of water from the active system to the outside, and vice versa.

However, these seals are capable of improvement on several counts since they must meet as best as possible at least three requirements which are not necessarily compatible. Firstly, as we have seen, they must isolate the active system from the outside. They must therefore act as efficiently as possible as a barrier, especially to water in vapour form. The seals used hitherto are not entirely satisfactory from this standpoint. Secondly, their fitting—the way in which they are placed along the edge of the devices—is not necessarily the simplest from the industrial point of view. Finally, their mechanical properties can be well below what is required.

SUMMARY OF THE INVENTION

The object of the invention is therefore to improve the design of the peripheral seals for sealing the aforementioned laminated glazing, especially with regard to their chemical properties and/or their mechanical properties and/or their fitting and/or their configuration with respect to the substrates protecting the active systems.

DETAILED DESCRIPTION OF THE INVENTION

Figure 1A:
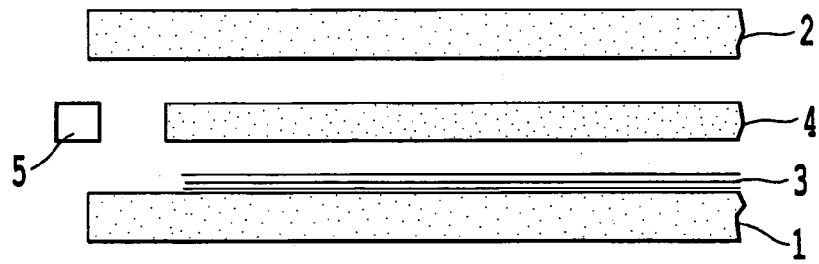
FIGS. 1a and 1b illustrates an embodiment of the laminated glazing of the invention.

The subject of the invention is firstly laminated glazing, the various structures of which have been described above and which includes an "active system" from among one of those mentioned previously, which is placed between two substrates of the said glazing. The invention consists in providing this glazing with a first peripheral sealing means for the active system, especially one sealing against water in vapour form, comprising at least one seal based on one or more hot-melt polymers chosen from at least one of the following polymer families: ethylene-vinyl acetate, polyisobutylene and polyamide. These polymers are also in the form of copolymers and branched polymers. These three families of hot-melt polymers are particularly advantageous for at least two reasons: they provide high intrinsic sealing and are, in particular, highly impermeable to water in vapour form. As they are hot-melts, they are also particularly easy to process, at a lower cost: they may be easily injected in liquid or semiliquid form at the desired points by known industrial means. They may also be fitted in the form of pre-extruded or precast beads.

These polymers preferably constitute between 40 and 98% by weight of the constituent material of the seal. Additives may be added to them, these especially having three different functions:

firstly, at least one crosslinking agent, for example of the isocyanate and/or epoxide type, may be added;

secondly, a number of mineral fillers, preferably in powder form, may be added, and for example aluminium or magnesium oxide, silica sand, quartz, diatomaceous earth, thermal silica, also called pyrogenic silica, and nonpyrogenic silica. The fillers may also be silicates such as talc, mica, kaolin, glass microspheres, or other mineral powders such as calcium carbonate, or mineral fibres;

finally, one or more resins called "tackifying resins" or "tackifiers" may be added, the function of which is to improve the adhesion of the seal to the material with which it will come into contact. When it is inserted between two substrates, the tackifier will therefore be a compound for improving the mutual adhesion between the seal and the substrate (glass, polymer, etc.) or between the seal and the material capable of covering the substrate in their contact regions (mineral layer, etc.). They may especially be compounds of very low molar mass, of at most 10,000, especially less than 5000 or between 500 and 2000, and a softening point preferably between 50 and 130° C., especially between 90 and 100° C. An example is a saturated hydrocarbon aliphatic resin.

In point of fact it is important not only to choose a polymer which is intrinsically impermeable but which also adheres very well to the materials with which it is in contact, so as to prevent the creation of diffusion paths at the interface between the seal and the material to be sealed, so as to avoid any delamination of the seal. Instead of or in addition to the use of such a tackifier, it is also possible to vary the distribution of the molar masses present in the hot-melt polymer, most particularly in the case of polyisobutylenes: mixing several molar masses results in good creep resistance at high temperature (in the case of high molar masses) and also good adhesion, or good tack, to the materials to be sealed (in the case of low molar masses).

In general, the seals according to the invention advantageously have a softening point of between 70 and 180° C., especially between 90 and 100° C. or between 145 and 170° C.; they may therefore be liquefied in order to fit them or form them at industrially acceptable temperatures.

Advantageously, they also have a viscosity of between 0.1 and 20 Pa.s, especially between 0.8 and 8 Pa.s, measured at 190° C.

Finally, they advantageously have a water vapour permeability of less than or equal to 5 or 4 or 3 $g/m^2/24$ h, especially less than or equal to 1 $g/m^2/24$ h, according to the ASTM E 9663 T standard; this means that they are particularly impermeable to water.

The hot-melt polymers of the seals described above may be substituted with mastics, which are polymers behaving, when hot, like hot-melt polymers, but their transformation from the solid phase to the liquid phase, unlike in hot-melts, is not reversible (since they are thermosets). The advantage of being able to fit them into the glazing in the liquid phase also applies in the case of this family of mastics, provided that those selected from them crosslink only after they have been fitted. Most particularly preferable are mastics based on polyurethane, whose water vapour permeability is less than or equal to 4, or even close to 2, $g/m^2/24$ h. PU-based mastics meeting the desired criteria (especially having a water vapour permeability of less than or equal to 5 g/m²/24 h) are the mastics sold under the reference IS442 by Tremco (permeability of 5 g/m²/24 h) and under the reference PU 3189/2 by Le Joint Francais (permeability of 4 g/m²/24 h). The advantage of these particular mastics is that they ensure good impermeability both to water vapour and to liquid water, whereas it is preferable to "double up" seals based on hot-melt polymers with a second seal intended to serve as a barrier to liquid water (examples of these are mentioned below). They may also be polysulphide-based or silicone-based mastics.

To conclude on the chemical nature of the polymers used in the seals according to the invention, these hot-melt polymers are known to be used in very different applications, for example in the shoe industry and in the production of cardboard articles, and have proved to be particularly beneficial in the other totally different technical field relating to the invention.

Another aspect of the invention relates to the way in which the mechanical strength of the seals for such glazing can be improved, especially, but not exclusively, the hot-melt seals described above; the subject of the invention is also the same type of glazing provided with a first peripheral sealing means, especially for sealing against water in vapour form, which comprises at least one polymer-based seal and which is combined with means for mechanically reinforcing and/or for gauging the gap between the two substrates, between which the active system lies.

In a number of situations it is highly advantageous for the seal to have a significant mechanical strength. This is most particularly the case when the device is in the form of laminated glazing comprising two rigid or semirigid substrates, between which the active system is placed, and one or more joining polymer sheets. In this case, one suitable configuration consists in ensuring that the joining polymer sheet or sheets (together with the active system itself) has (have) smaller dimensions than those of the two substrates. Around the periphery of the glazing is thus created a groove in which the seal or seals can be housed. However, this configuration may mechanically stress the glazing too much during the lamination operation (which is usually carried out under pressure, and generally hot). This is because the edges of the glass-type substrates, in the region where the abovementioned peripheral groove lies, are cantilevered and, under pressure, tend to bend with respect to the more central part of the said substrates.

The laminating operation will therefore tend to initiate delamination at the edges of the thermoplastic sheets and consequently have a tendency to generate bubbles. In the worst case, there may even be a risk of the glass substrates breaking. Under these conditions, it is extremely advantageous to use one or more peripheral seals which are mechanically reinforced; these mechanical reinforcements will be able to maintain the appropriate gap between the two substrates around their periphery, by opposing their tendency to bend in the "critical" peripheral region of the groove, at least during the assembly operation. In certain applications, this mechanical reinforcement may also prove to be very useful in the end product, independently of the fact that there may or may not be a need for an assembly operation of the pressure lamination type.

A first type of reinforcing/gauging means may be in the form of rigid or semirigid balls, especially made of metal of the aluminium or stainless steel type, or made of glass or made of ceramic. The balls may also be made of a zeolite, preferably a hydrophilic one.

It is known to use aluminium balls in the seals for curved double glazing, as described especially in Patents DE-91 162068, DE-41 04108 and EP-499 525. However, in the case of double-glazing units, their function is different: in a double-glazing unit, the "void" of material between the two glass panes is not around the periphery, but in the central part of the glazing. Furthermore, double-glazing units do not undergo a hot pressure assembly operation. Finally, in the case of double-glazing units, the balls used in the seals serve to maintain a nominal gap between the glass panes of the final double-glazing unit, but counter the tendency of the edges of the glass panes to bend in the opposite direction to the bending that the laminated glazing of more particular interest to the invention tends to undergo.

The invention has therefore found a new application for these localized reinforcements known in the insulating glazing field.

A second type of reinforcing/gauging means may be in the form of studs. They may be of square, rectangular or trapezoidal cross section. They may be made of metal, glass, ceramic or low-melting-point glass frit. Their geometrical shape can vary and may be any type of polyhedron. The important point is that they should preferably define bearing surfaces which are plane with respect to the substrate between which they will be placed. In fact, this type of stud is known in quite another application, namely in what are called "vacuum" double-glazing units in which the vacuum is created between the two glass panes so as to achieve a very high thermal insulation for a minimum overall size.

Examples of these studs and of their methods of manufacture and of fitting are described in Patents EP-645 516 and EP-627 389.

These studs or these balls are preferably embedded in the polymer-based seal, or at least partially incrusted therein. To combine the balls with the seal, the device described in the abovementioned Patent DE-41 04108 may especially be used.

With regard to depositing the studs, these need to be deposited one by one in order for them to be placed correctly. Both in the case of the balls and in the case of the studs, a uniform spacing of the balls/studs along the seal may be provided. The spacing between two following balls or two following studs may, for example, be from 1 to 5 cm with, in any case, their systematic presence in the corners (one ball or stud on each side, close to the corner). The balls or studs may also be positioned so as to be spaced apart in a random fashion.

The third type of reinforcing/gauging means may be in the form of a frame, especially made of metal, glass, ceramic or low-melting-point glass frit. The cross section of the frame may be square, rectangular, etc., like that of the abovementioned studs. This frame may be made as one piece, or as several parts which are butted together during fitting. This may thus be compared with the structure of the generally metal frames/spacers which are used to maintain the gap between the glass panes of standard double-glazing units. Advantageously, at least one part of the bearing surfaces via which the frame bears on the substrates is coated with one or more polymer-based seals. It is thus possible to have a frame of square or H-shaped cross section whose bearing surfaces are entirely coated with a seal before being fitted.

A fourth type of reinforcing/gauging means consists in using one or more metal wires. Advantageously, these are entirely sheathed/embedded in a preformed polymer seal, for example a seal of cylindrical cross section, which is then softened and fitted in an appropriate manner. These wires may be made of aluminium, steel or copper, and preferably of a relatively ductile metal.

These various reinforcing means have to be sized appropriately. Thus, with regard to laminated glazing, it is preferable for the diameter ($d_1$) of the balls and/or the height ($h_1$) of the studs and/or the diameter ($d_2$) of the metal wire or wires and/or the height ($h_2$) of the frame to be such that these various means can be housed without any problem between the two substrates. They may even serve to gauge their spacing.

In laminated glazing, it is preferable for the following relationship to be satisfied:

$$\tfrac{1}{2}e \leq h_1, h_2, d_1, d_2 \leq e - 0.1 \text{ mm},$$

where (e) is the total thickness of the thermoplastic interlayer or interlayers used for the lamination, or the desired gap between the two substrates, whether or not there is a polymer interlay. In general, this value (e) is between 0.025 mm and 1.25 mm, preferably between 0.35 and 1.25 mm. (When there is a thermoplastic sheet, its thickness is generally between 0.35 and 1.25 mm; when there is a double-sided adhesive polymer, its thickness is generally between 0.025 and 0.1 mm. The mechanical reinforcement is most useful in the case of thermoplastic polymers.)

Advantageously, the glazing according to the invention includes a second peripheral sealing means in the form of at least one seal which seals against liquid water. This may especially be chosen to be based on a polyurethane, a silicone or a polysulphide.

This second peripheral sealing means may also take the form of a seal made of a thermoplastic polymer, for example polyvinyl butyral PVB, ethylene-vinyl acetate EVA, or certain polyurethanes. Advantageously, this seal may in fact be of the same chemical nature, or similar chemical nature, as that of the thermoplastic interlayers used to laminate the glazing.

The interlayer or interlayers are thus cut so as to be set back with respect to the two glass panes, in order to create a peripheral groove in which to house the seal or seals, and measures may be taken to ensure that the groove is provided with one or two seals as described above. Next, the "filling" of the groove may be completed with a strip of thermoplastic polymer of the same kind as the interlayers. These strips correctly fulfil the role of sealing against liquids and are made of a material already available since this has been used to make the interlayers; this is a simple and effective solution, namely that of thus "abducting" the thermoplastic sheets so that they fulfil the role of complementary seals. This thermoplastic seal is preferably continuous all around the glazing. It may also be discontinuous. In this case it "imprisons" the other seal or seals placed before it in the peripheral groove.

In this particular case, it is preferable for the first and second sealing means of the device to comprise seals which are adjoined. For example, two types of seals having chemically different formulations may be coinjection-moulded or coextruded. It is also possible to deposit two pre-extruded or precast beads side by side. Measures may be taken to ensure that all the seals are housed in the peripheral groove described above. This then results in a device whose sealing means are flush and not "overhanging" the substrates, this being both aesthetically attractive and practical when mounting the substrate in vehicles or buildings.

It is possible to fit the seal or seals according to the invention on the already assembled device. It is also possible to fit them on one of the substrates of the device, before it is joined to the other substrate (with the abovementioned beads).

It is also possible to use a single seal provided that its chemical nature makes it satisfactorily impermeable both to liquid water and to water vapour.

It is also possible to adapt the actual shape of the substrates of the device, in order to improve the effectiveness of the sealing and/or to make it easier to fit the seals. Thus, it is possible to use substrates whose inner edge (that turned towards the other substrate) is bevelled, thereby making it possible to define a wider peripheral groove, which no longer has a simple rectangular cross section but which has an at least partly trapezoidal cross section, for example.

Advantageously, the seals used in the context of the invention are placed so as not to come into contact with the electrically conducting layers of the active system.

The invention will be described below in further detail with the following nonlimiting examples using FIGS. 1a, 1b, 2 and 3. These figures show, in cross section, and highly schematically, laminated electrochromic glazing sealed according to the invention. The examples all relate to "all solid-state" electrochromic glazing.

The electroactive multilayer of an "all solid-state" electrochromic system is typically as follows:
  a transparent first conducting layer made of fluorine-doped tin oxide $F:SnO_2$ (or tin-doped indium oxide ITO);
  a first layer of anodic electrochromic material, made of hydrated iridium oxide (or hydrated nickel oxide);
  an electrolyte composed of a layer of tungsten oxide associated with a layer of hydrated tantalum oxide (or of aluminium-doped silicon oxide $Al:SiO_2$ or zirconium oxide $ZrO_2$ which may or may not be doped, for example, doped with yttrium);
  a second, cathodic layer of electrochromic material, based on tungsten oxide, which is optionally hydrated; and
  a second transparent electrically conducting layer made of ITO for example.

Further details about these layers or similar layers may be found in the patents mentioned in the preamble to the application.

This multilayer is incorporated into the laminated glazing shown in FIGS. 1a, 1b, 2 and 3: they are composed of two glass panes 1, 2 having a thickness of 2.1 mm, between which are the electrochromic multilayer 3 and a thermoplastic interlayer 4 made of polyurethane (PU) having a thickness of 0.76 mm (the PU may be replaced with ethylene-vinyl acetate EVA).

Figure 1B:
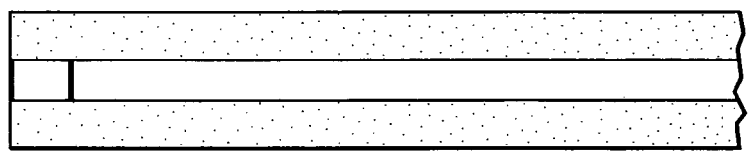

FIGS. 1a, 1b show the first seal 5 before assembly and then once the glazing has been assembled.

Figure 2:
FIG. 2 illustrates another embodiment of the laminated glazing of the invention, wherein glass panes 1 and 2 are beveled.
Figure 3:
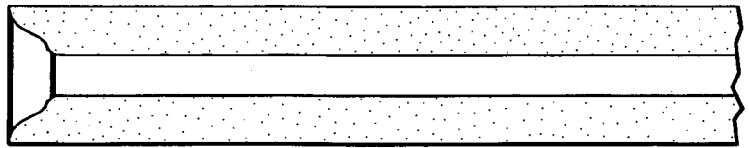
FIG. 3 illustrates another embodiment of the laminated glazing of the invention, wherein glass panes 1 and 2 are beveled.

FIGS. 2 and 3 are variants, in which the inner edges of the glass panes 1, 2 have been bevelled.

In all cases, the interlayer has dimensions which are smaller than those of the two glass panes, so as to define a peripheral groove in which the seal is housed. When the glass panes are bevelled, the peripheral groove is no longer of rectangular cross section but of trapezoidal cross section (FIG. 2) or of trapezoidal shape with rounded edges (FIG. 3).

The seal 5 is then flush and entirely fills the groove. An example of the formulation for this seal is as follows:
  an ethylene-vinyl acetate base containing 5 to 40% vinyl acetate and 40 to 95% ethylene (this is especially the EVA sold by National Starch under the name "Instant Pak 2300" or the EVA sold by TRL under the name "Thermelt 2147/2157), this base possibly containing at least one of the following additives:
- a tackifying resin;
- a crosslinking agent;
- a filler.

With this type of formulation, a seal is obtained which is both remarkably impermeable to water in vapour form and adheres very strongly to glass, making it very effective.

Alternatively, instead of the EVA-based seal, it is possible to use a seal based on a polyamide or polyisobutylene.

In the aforementioned example, the seal is a hot-melt. It can therefore be melted and then injected under pressure into the peripheral groove of the glazing once it has been assembled. It can also be fitted around the periphery of the glass pane 1 before it is joined to the glass pane 2, the laminating operation gauging it to the desired cross section under the effect of the pressure and possibly the heat.

A second seal (not shown) may usually be provided, this surrounding the seal 5 and serving, in a known manner, to seal against liquid water. It may be deposited as follows:
- by extrusion of polyurethane PU or of any thermoplastic elastomer TPE;
- by reactive injection moulding of PU;
- by thermoplastic injection moulding of a PVC (polyvinyl chloride)/TPE blend; and
- by injection moulding and vulcanization of an ethylene-propylene-diene terpolymer EPDM.

A strip of PU or EVA of the same type as that of the thermoplastic interlayer 4 may also be provided.

The fitting may take place at the same time as or after the seal 5 has been fitted (before or after assembling the glazing). It may be "overhanging", covering the edges of the two glass panes, or adjoin the seal 5 in the peripheral groove of the glazing so that the combination of the two seals is flush in the final laminated glazing.

The seal 5 is, according to a preferred variant, mechanically reinforced using glass or zeolite balls having a diameter of about 0.6 mm (and therefore slightly less than the thickness of the PU interlayer). These balls are partially inserted around the outer edge of the seal 5 using the device described in the aforementioned Patent DE-41 04108.9, so that the spacing between two balls is about 2 cm. These balls play a very positive role in the assembly of the glazing. In FIGS. 1*a* and 1*b* it will be understood that, when the glazing is under pressure during the lamination operation, the edges of the glazing corresponding to the peripheral region devoid of interlayer tend to bend in the direction indicated by the arrows. Consequently, there is a risk of the interlayer debonding at its periphery and even a risk of the glass breaking. The presence of the balls in the seal 5 will maintain the spacing between the glass panes in this sensitive peripheral region and prevent this bending phenomenon. These balls therefore act as local reinforcement during the lamination (of course, they continue to reinforce the seal in the final product). They are easy to fit, effective and inexpensive.

The invention has therefore developed a novel chemical formulation for a seal and a novel means of mechanically reinforcing it. These sealing means are effective when it comes to protecting layers/elements between two substrates which are sensitive to water and, in general, to any exposure to the atmosphere.

Of course, it is also possible to use them for glazing with an active system operating in reflection (electrochromic mirror of the rear-view mirror type, for example) or for glazing in which the thermoplastic interlayer is replaced by a film of double-sided adhesive polymer.

The sealing means may also be applied to nonglass substrates. They may also be applied to active systems which require peripheral sealing but are not in the form of laminated glazing (double glazing, systems without a rigid substrate, etc.).

The invention claimed is:

1. A laminated glazing comprising a first substrate having a first length, a first width, and a first peripheral edge; a second substrate having a second length, a second width, and a second peripheral edge; an active system disposed between the first substrate and the second substrate; a peripheral groove between the first peripheral edge and the second peripheral edge; and at least two peripheral seals disposed in the peripheral groove, wherein each of the at least two peripheral seals runs contiguously from the first substrate to the second substrate, and wherein each of the at least two peripheral seals comprises a hot-melt polymer selected from the group consisting of ethylene-vinyl acetates, polyisobutylenes, and polyamides or a mastic selected from the group consisting of polyurethanes, polysulfides, or silicons, wherein the active system is electronically controllable, has variable energy/optical properties, and is selected from the group consisting of a solid-state electrochromic system, an optical valve system, a liquid crystal system, a viologen-based system, a photovoltaic system, and an electroluminescent system.

2. The laminated glazing of claim 1, further comprising a separator between the first peripheral edge and the second peripheral edge.

3. The laminated glazing of claim 1, wherein the active system comprises a thermochromic layer, a thermotropic layer, a photochromic layer, a solar control layer, a low-emissivity layer, or a multilayer.

4. The laminated glazing of claim 1, wherein the active system is a grid of heating wires or a heating layer.

5. The laminated glazing of claim 1, further comprising an interlayer of a thermoplastic polymer having a third length and a third width wherein the interlayer is disposed between the first substrate and the second substrate.

6. The laminated glazing of claim 5, wherein the third length and third width of the interlayer are smaller than the first length and fast width of the first substrate and the second length and second width of the second substrate.

7. The laminated glazing of claim 1, wherein at least one of the at least two peripheral seals is entirely disposed in the peripheral groove.

8. The laminated glazing of claim 6, wherein at least one of the first peripheral edge or the second peripheral edge is beveled.

9. The laminated glazing of claim 6, wherein both the first peripheral edge and the second peripheral edge are beveled.

10. The laminated glazing of claim 1, wherein at least one of the at least two peripheral seals further comprises at least one cross-linking agent.

11. The laminated glazing of claim 10, wherein the cross-linking agent is an isocyanate or an epoxide.

12. The laminated glazing of claim 1, wherein at least one of the at least two peripheral seals further comprises at least one tackifying agent.

13. The laminated glazing of claim 12, wherein the tackifying agent is a hydrocarbon aliphatic resin having a molar mass of less than 10,000.

14. The laminated glazing of claim 1, wherein at least one of the at least two peripheral seals further comprises at least one mineral filler.

15. The laminated glazing of claim 14, wherein the mineral filler is selected from the group consisting of aluminum oxide, magnesium oxide, silica sand, quartz, pyrogenic silica, non-pyrogenic silica, talc, mica, kaolin, glass microspheres, and calcium carbonate.

16. The laminated glazing of claim 1, wherein at least one of the at least two peripheral seals has a softening point of from 70 C. to 180° C.

17. The laminated glazing of claim 1, wherein at least one of the at least two peripheral seals has a viscosity of 0.01 to 20 Pas.

18. The laminated glazing of claim 1, wherein at least one of the at least two peripheral seals has a water vapor permeability of 5 g/m$^2$/24 h or less.

19. The laminated glazing of claim 1, wherein at least one of the at least two peripheral seals is disposed in the peripheral groove by extruding or injecting the peripheral seal as a liquid.

20. The laminated glazing of claim 2, wherein the seperator comprises a rigid or semi-rigid ball, a stud, or a metal wire.

21. The laminated glazing of claim 20, wherein the rigid or semi-rigid ball comprises metal, glass, ceramic, or zoolite.

22. The laminated glazing of claim 20, wherein the stud has a square, rectangular, or trapezoidal cross section and is made of metal, glass, ceramic, or a low melting point glass frit.

23. The laminated glazing of claim 20, wherein the rigid or semi-rigid ball, the stud, or the metal wire is embedded in at least one of the at least two peripheral seals.

24. The laminated glazing of claim 2, wherein the seperator comprises a name made of metal, glass, ceramic, or a low melting point glass frit.

25. The laminated glazing of claim 20, wherein the diameter of the rigid or semi-rigid ball, the height of the stud, or the diameter of the wire is between ½e and e−0.1 mm wherein e is the thickness of the space between the fast peripheral edge and the second peripheral edge.

26. The laminated glazing of claim 25, wherein e ranges from 0.35 nun to 1.25 mm.

27. The laminated glazing of claim 24, wherein the height of the frame is between ½e and e−0.1 mm wherein e is the thickness of the space between the first peripheral edge and the second peripheral edge.

28. The laminated glazing of claim 27, wherein e ranges from 0.35 mm to 1.25 mm.

29. The laminated glazing of claim 1, therein the the at least two peripheral seals are joined together.

30. A process for manufacturing the glazing of claim 1 comprising placing an active system disposed between a first substrate having a first peripheral edge and a second substrate having a second peripheral edge to provide a component having a peripheral groove between the first peripheral edge and the second peripheral edge and injecting at least one of the at least two peripheral seals in liquid form into the peripheral groove.

31. A process for manufacturing the glazing of claim 1 comprising positioning an active system on a surface of a first substrate having a first peripheral edge; extruding at least one bead of at least one of the at least two peripheral seals along the first peripheral edge, and positioning a second substrate having a second peripheral edge on the active system so that the active system is disposed between the first substrate and the second substrate and the second peripheral edge contacts at least one of the at least two peripheral seals.

* * * * *